United States Patent Office 3,639,370
Patented Feb. 1, 1972

3,639,370
PROCESS FOR POLYMERIZATION OF OLEFINIC COMPOUNDS
Wolfgang Edl, 3 Marienstrasse, 8021 Grosshesselohe, Germany; Heinz W. Meyer, 1 Arnimstrasse, 8 Munich, Germany; and Dieter Schmid, 11 Habenschadenstrasse, 8023 Pullach, Germany
No Drawing. Filed Dec. 27, 1968, Ser. No. 787,591
Claims priority, application Netherlands, Dec. 28, 1967, 6717760
Int. Cl. C08f 3/62, 3/76, 7/04
U.S. Cl. 260—88.7                                            10 Claims

ABSTRACT OF THE DISCLOSURE

A process which comprises polymerizing olefinic compounds in presence of a polymerization initiator comprising, in combination, a peroxy compound selected from an organic perester containing the structure

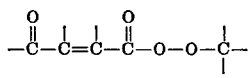

and a diacyl peroxide containing the structure

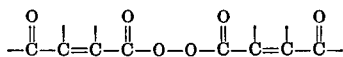

and an activating compound selected from the classes (I) polyfunctional sulfhydryl compounds
(II) compounds with sulfhydryl radicals bonded to heteropolybonds selected from
    (a) salts of thiocyanic acid
    (b) thiocarboxylic acids and thiocarbonamide
    (c) dithiocarbamates and mercaptothiazoles
    (d) thioureas, substituted thioureas, thiobarbituric acids, thiosemicarbazides and mercaptoimidazoles
    (e) O,O-diesters of dithiophosphoric acid and dithiophosphinic acid
(III) alkyl and aryl sulphonyl hydrazides
(IV) 4-hydroxy pyridines and their tautomeric 4-pyridones, and
(V) compounds having the formula $(R)_3P$ and $(RO)_3P$ wherein R is selected from an alkyl group having from 1 to 6 carbon atoms and an aryl group. When the activating compound of classes (I) to (V) contains an acidic hydrogen atom, a base reacting substance, e.g., an amine, therefor included in the initiator.

---

This invention relates to peroxygen compounds and to a process for polymerization of olefinic compounds employing such peroxygen compounds as polymerization initiators. The term polymerization includes the cross-linking of unsaturated polyester resins as well as the simple polymerization of olefinic monomers.

Initiators used for radical polymerization of ethylenically unsaturated compounds are chiefly organic peroxides. For polymerization to take place at a rate which is useful industrially, the rate of formation of free radicals must be fairly high. The majority of organic peroxides require the application of heat to decompose sufficiently rapidly and thus they are suitable for industrial polymerization at from medium to relatively high temperatures, i.e., from about 60° C. upward.

It has recently been recognized that the temperature of polymerization has a considerable effect on the properties of the polymerizate obtained. Lower temperatures lead to high molecular weight polymers and also greater linearity of the polymers, and mechanical properties such as density and firmness of the polymer are improved. Polymerization at lower temperatures may therefore be advantageous when a polymer having such properties is desired. A known method of low temperature polymerization which may be used in the manufacture of "cold rubber" and the curing of unsaturated polyester and methacrylate resins, includes activation of peroxides with reducing agents such as heavy metal salts, amines, mercaptans, sulphinic acid or certain phosphorus compounds such as phenyl phosphinic acid. Redox activators of this type can cause effective radical production at lower temperatures than would be possible by purely thermal activation. The chemical mechanism of such a system is largely unknown and the choice of suitable activators and activatable peroxides, and the amounts thereof used, is largely a matter of trial and error. It has been found, also, that matching of the particular peroxide and activator is critical. A further practical disadvantage of many redox systems is discoloration of the resulting polymers. Redox activator systems are also generally effective only in aqueous emulsion polymerization. Up to the present, no redox system has been found which has universal application for other polymerization processes and which exhibits a high degree of effectiveness in, for instance, substance or block polymerization. Moreover, use of redox systems may lead to introduction of undesirable impurities into the polymer and many redox activators possess an unpleasant odor or have poor stability.

It is known that perester molecules bearing an oxygen or sulfur function in the α position have quite low decomposition temperatures and are in fact low temperature initiators. However, these substances decompose readily at lower temperatures and are difficult to use in low temperature polymerization since they require the use of special precautions in transportation and storage and thus are unsuited to commercial use. If, for example, t-butyl perchloroacetate is combined with a phenolate or thiophenolate, a labile peroxide should be formed in situ. Exchange of the chlorine atom for an oxygen, sulphur or nitrogen function evidently takes place at too slow a rate, however, to make this a practicable low temperature polymerization system.

The present invention provides the use, in a process for polymerization, of a polymerization initiator comprising, in combination, an organic perester containing the structure

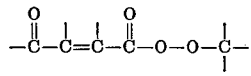

or a diacyl peroxide containing the structure

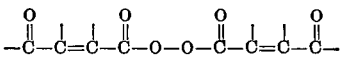

and a activator compound selected from the classes (I) polyfunctional sulfhydryl compounds
(II) compounds with sulfhydryl groups bonded to heteropolybonds selected from
    (a) salts of thiocyanic acid
    (b) thiocarboxylic acids or thiocarbonamides
    (c) dithiocarbamates or mercaptothiazoles
    (d) thiourea, substituted, thioureas, thiobarbituric acids, thiosemicarbazides or mercaptoimidazoles
    (e) O,O-diester of dithiophosphoric acid or dithiophosphinic acid
(III) alkyl or aryl sulphonyl hydrazides
(IV) 4-hydroxy pyridines and tautomers thereof (4-pyridones)
(V) tertiary phosphines, $(R)_3P$, or tertiary phosphites, $(RO)_3P$, wherein R is an alkyl group having from 1 to 6 carbons or an aryl group.

The activator compound is used in at least an equal molar quantity with respect to the quantity of the peroxy compound.

All of the compounds in classes (I) to (V) possess powerful nucleophilic properties and therefore are capable of adding to a carbon-carbon double bond activated by an adjacent —C=O-group. Thus, it is believed that a labile peroxide compound is formed by in-situinteraction of the activators with the peroxides according to the invention. The invention however is not found by this explanation.

Preferably the perester or diacyl peroxide used is based on a structure which can be derived from a known ethylene dicarboxylic acid or semiester thereof by reaction with a hydroperoxide, particularly a t-alkyl hydroperoxide, or with $H_2O_2$. Particularly suitable peresters are t-butyl permaleinate and t-butyl perethyl fumarate and a particularly suitable diacyl peroxide is bis-ethyl fumaroyl peroxide. Alternatively, the perester group is another t-alkyl group for example having up to 8 carbon atoms in each alkyl group. The free valency attached to the —C=O group in the above formula is preferably occupied by a hydroxy group or by an alkoxy group which preferably contains not more than 6 carbon atoms. The remaining free valencies are preferably occupied by hydrogen atoms.

Polyfunctional sulfhydryl compounds are defined as compounds having a sulfhydryl group together with one or more different functional groups such as carbonyl, hydroxyl, or amino groups. Preferably the functional group and the sulfhydryl group are separated by from 2 to 4 carbon atoms. Preferably the compound is a mercapto carboxylic acid such as mercapto succinic acid or mercapto propionic acid, a thiocarboxylic acid such as thiosalicylic acid, a hydroxy mercaptan, particularly a β-hydroxy mercaptan such as β-hydroxy ethyl mercaptan, an amino mercaptan, particularly a β-amino mercaptan such as β-amino ethyl mercaptan, a mercapto amino acid such as cysteine, or a mercapto amino acid ester such as cysteine ethyl ester as such or as its hydrochloride. Polyfunctional compounds of limited molecular weight are preferred. Thus, where the compound is aliphatic it preferably contains not more than 5 carbon atoms total and where the compound contains an aromatic or alicyclic ring it preferably contains not more than 2 carbon atoms in addition to those in the ring.

Some alkali metal or alkaline earth metal salts of thiocyanic acid are insoluble or have a very limited solubility in organic materials such as resins or plastics and these are not suitable for use in the present invention. A particularly useful salt of thiocyanic acid is ammonium thiocyanate. Thiocarboxylic acids and thiocarbonamides preferably used according to the present invention have the structural formulae

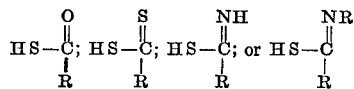

or are tautomers thereof. Preferably R is alkyl and contains not more than 4 carbon atoms, e.g. methyl, or aromatic, e.g. phenyl. Particularly suitable compounds are thioacetic acid, thiobenzoic acid and thioacetamide.

Dithiocarbamates and mercaptothiazoles which are used according to the invention preferably have the tautomeric structural formula

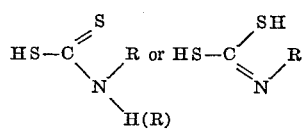

or may be salts thereof, e.g. zinc, sodium or quaternary ammonium salts, the latter being either substituted or not. The R groups are preferably alkyl groups containing from 1 to 5 carbon atoms or cycloalkyl groups containing 6 carbon atoms and may form part of a ring structure. Examples of suitable compounds include:

An N-pentamethylene dithiocarbamate,
pentamethylene ammonium N-pentamethylene dithiocarbamate,
Na N-cyclohexyl N-ethyl dithiocarbamate and
N-cyclohexyl N-ethylammonium N-cyclohexyl N-ethyl dithiocarbamate.

Alternatively the S—C—N structure may be part of a ring and particularly suitable examples of this are mercapto benzithiazole and its zinc salt.

The compounds of group IId which are identified above are characterized by the tautomeric structures

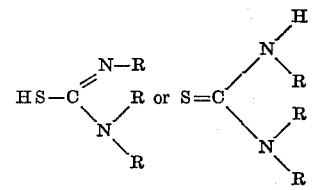

where R may be hydrogen or an alkyl group which preferably contains not more than 4 carbon atoms, an aryl group, preferably phenyl, or a cycloaliphatic group, preferably cyclohexyl. Examples of suitable substituted thioureas are allyl thiourea, phenyl thiourea, N,N'-diethyl thiourea, ethylene thiourea, N,N'-diisopropyl thiourea, N,N'-dibutyl thiourea, N-allyl-N'-hydroxyethyl thiourea, N-methyl-N-phenyl thiourea and N,N'-diphenyl thiourea. A suitable mercaptoimidazole is mercaptobenzimidazole or its zinc salt.

Of the dithiophosphoric or dithiophosphinic acid esters which are suitable for use in this inveniton, those having the structure

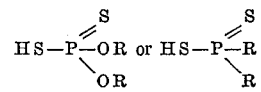

wherein R preferably is phenyl or alkyl having not more than 6 carbon atoms, are particularly suitable. Other alkyl, cycloalkyl or aryl groups are within the invention as are salts of the above compounds.

Examples of particularly suitable compounds belonging to this group are:

O,O' diethyl diethiophosphoric acid
sodium O,O- diethyl dithiophosphate
ammonium O,O' diethyl dithiophosphate and
diphenyl dithiophosphinic acid.

Alkyl sulphonyl hydrazides useful according to this invention preferably have an alkyl group containing less than 6 carbon atoms, e.g. methyl. The preferred aryl sulphonyl hydrazide is the phenyl compound.

Included within group (IV) is 4 pyridone.

Tertiary phosphines according to this invention are preferably the tributyl, trioctyl or triphenyl compounds and the preferred phosphite is the triethyl compound.

A modification of the present invention provides for the use of a perester in combination with a compound of any of classes (I) to (V), which perester can be obtained by reaction of 2,5 dimethyl, 2,5 dihydroperoxy hexane with an acid or semi-ester having the essential

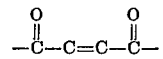

grouping hereinbefore described. Such as perester is particularly useful.

The preferred quantity of perester or diacyl peroxide is from 0.01% to 5% and particularly from 0.01% to 1% by weight of the monomer or resin. The preferred quantity of activator compound of any of classes (I) to (V) is at least equimolar and preferably not more than twice equimolar with reference to the quantity of organic perester or diacyl peroxide used.

Some of the activators which are suitable for use in the present invention are known to exist in tautomeric forms, or tautomeric structures are taken into account when considering them. The given formulae characterizing the activators suitable for use in accordance with the invention are taken to include their tautomeric equivalents. In the same manner, the inclusion of the structural element, determining effectiveness, into a ring system must also be regarded as falling within the framework of this invention.

A particularly aliphatic embodiment of the present invention consists in the use, in combination with the perester or diacyl peroxide and the activating compound belonging to groups (I) to (V) above, when that activating compound has an acidic hydrogen atom, of a base reacting substance. The preferred base reacting substances are aliphatic amines, for example t-alkyl amines such as triisopropanolamine, or heterocyclic amines such as pyridine. The use of such a combination results in a considerable decrease in the t-gel and t-max times when crosslinking unsaturated polyester resins and a greater degree of polymerization of monomers. The base is advantageously used in an equimolar quantity with respect to the activator used.

In addition to the initiator systems in accordance with the present invention, other known initiators and accelerators can be used. Polymerization can also be carried out in the presence of the normal auxiliaries such as controllers, stabilizers, fillers, pigments, plasticizers, UV absorbers, etc.

Examples of olefinically unsaturated compounds which can be homo- or co-polymerized in accordance with the invention are: ethylene; vinyl chloride; vinylidene chloride; vinyl esters and ethers; acrylic and methacrylic acid and their derivatives; styrene; divinyl benzene; allyl compounds; esters of maleic; fumaric and itaconic acid; and unsaturated polyesters. An essential advantage of the initiator systems used in accordance with the present invention is the fact that their components can be transported and stored without special precautions having to be taken. The initiator systems in accordance with the invention are suitable for polymerization in bulk, solution, suspension and in emulsion form.

Suitable polymerization temperatures, for example, include those not exceeding 40° C. and, more specifically, those in the range of 10° C. to 30° C.

EXAMPLE 1

Curing of unsaturated polyester resins 50 gram samples of a commercial, reactive UP resin known by the trade name "Palatal P6" were mixed at 20° C. with the following components:

(a) 2.66 mmole of one of the peroxides according to the invention, if necessary in the form of commercial pastes or solutions,
(b) 2.66 mmole of the compounds capable of addition, according to the invention and listed individually in the tables, if necessary in the form of solutions (the following solvents were used depending on the solubility of the compounds: methanol, ethanol, isopropanol, dioxane, cyclohexanone, benzene, dimethyl formamide, triethyl phosphate, N-methyl pyrrolidone, phthalic acid esters or styrene).
(c) 2.66 mmole of tri-isopropanolamine as a base in the form of a 50% solution in isopropanol, if used.

The so-called gel time ($t_{gel}$) and the time taken to reach the exothermic temperature maximum ($t_{max}$) were determined for quantitative characterization of the course of curing. In some cases, curing took place slowly despite rapid gelation and a maximum could not be determined exactly; however, the polymers were cured after 24 hours in the most extreme cases (characterized by f in the tables).

TABLE 1.—CURING WITH 2% BY WEIGHT OF A 50% PASTE OF t-BUTYL PERMALEINATE (—2.66 MMOLE)

| No. | Activator and class | Without base | | With base | |
|---|---|---|---|---|---|
| | | $t_{gel}$ | $t_{max}$ | $t_{gel}$ | $t_{max}$ |
| 1 | n-Lauryl mercaptan (Comparison) | No reaction | | | |
| 2 | t-Octyl mercaptan (Comparison) | No reaction | | | |
| 3 | Piperidine (Comparison) | No reaction | | | |
| 4 | Morpholine (Comparison) | No reaction | | | |
| 5 | Mercapto succinic acid (I) | 3 hours | f | 4 minutes | 13 minutes. |
| 6 | Thio salicylic acid (I) | 9 minutes | 26 minutes | 1 minute | 1 minute |
| 7 | β-Hydroxy ethyl mercaptan (I) | 3 hours | f | 26 minutes | f. |
| 8 | Cysteamine.HCl (I) | 25 minutes | 60 minutes | 2 minutes | 11 minutes. |
| 9 | Cysteine ethyl ester HCl (I) | 40 minutes | f | 1 minute | Do. |
| 10 | Ammonium thiocyanate (IIa) | 60 minutes | f | 9 minutes | 40 minutes. |
| 11 | Thio acetic acid (CH₃CO—SH) (IIb) | 9 minutes | 25 minutes | 1 minute | 5 minutes. |
| 12 | Thio benzoic acid (C₆H₅—CO—SH) (IIb) | 4 minutes | 12 minutes | do | Do. |
| 13 | Thio acetamide (IIb) | 25 minutes | f | 4 minutes | f. |
| 14 | Zn-N-pentamethylene dithiocarbamate (IIc) | 5 hours | f | 18 minutes | f. |
| 15 | Pentamethylene ammonium N-pentamethylene dithiocarbamate (IIc) | 7 minutes | f | 10 minutes | f. |
| 16 | Na-N-cyclohexyl-N-ethyl dithiocarbamate (IIc) | 3 minutes | f | 2 minutes | f. |
| 17 | N-cyclohexyl-N-ethyl-ammonium-N-cyclohexyl-N-ethyl dithiocarbamate (IIc) | do | f | do | f. |
| 18 | Mercapto benzthiazole (IIc) | 70 minutes | f | 22 minutes | f. |
| 19 | Zn salt of No. 18 (IIc) | 2 hours | f | 2 minutes | 10 minutes. |
| 20 | Thiourea (IId) | 5 minutes | 8 minutes | 1 minute | 4 minutes. |
| 21 | Allyl thiourea (IId) | 12 minutes | 25 minutes | 8 minutes | 14 minutes. |
| 22 | Phenyl thiourea (IId) | 19 minutes | 40 minutes | 4 minutes | 11 minutes. |
| 23 | N,N'-diethyl thiourea (IId) | 5 minutes | 10 minutes | 2 minutes | 8 minutes. |
| 24 | Ethylene thiourea (IId) | 12 minutes | 32 minutes | 10 minutes | 20 minutes. |
| 25 | N,N'-isopropyl thiourea (IId) | 6 minutes | 17 minutes | 5 minutes | 21 minutes. |
| 26 | N,N'-dibutyl thiourea (IId) | 9 minutes | 14 minutes | 4 minutes | 15 minutes. |
| 27 | "Liquid dialkyl thiourea 2ZZ" from Pennsalt USA (eutectic mixture of 1,3-diethyl- and 1,3 dibutyl thiourea) (IId) | 7 minutes | 16 minutes | 7 minutes | 20 minutes. |
| 28 | N-alkyl-N-(β-hydroxy ethyl) thiourea | 12 minutes | 25 minutes | 8 minutes | 16 minutes. |
| 29 | N-methyl-N-phenyl thiourea (IId) | 14 minutes | 27 minutes | 14 minutes | 27 minutes. |
| 30 | N,N'-diphenyl thiourea (IId) | 33 minutes | f | 21 minutes | f. |
| 31 | Thiobarbituric acid (IId) | No reaction | | 10 minutes | 22 minutes. |
| 32 | Thiosemicarbazide (IId) | 26 minutes | f | do | f. |
| 33 | Mercapto benzimidazole (IId) | 22 minutes | f | 28 minutes | f. |
| 34 | Zn salt of No. 33 (IId) | 26 minutes | f | 11 minutes | 40 minutes. |
| 35 | O,O-diethyl dithio phosphoric acid (IIe) | 2 hours | f | 1 minute | 4 minutes. |
| 36 | Na salt of No. 35 (IIe) | 1 minute | 1 minute | | |
| 37 | NH₄ salt of No. 35 (IIe) | <1 minute | 2 minutes | 5 seconds | 1 minute. |
| 38 | Tech. Zn-dialkyl dithiophosphate (AMOCO 195; 8:33% Zn (IIe) | 4 hours | f | 1 minute | 3 minutes. |
| 39 | AMOCO 198 (see No. 38, 8.80% Zn) (IIe) | do | f | do | 4 minutes. |
| 40 | Diphenyl dithio phosphinic acid (IIe) | 2 hours | f | do | 3 minutes. |
| 41 | Benzene sulphohydrazide (III) | 1.5 hours | f | do | 9 minutes. |
| 42 | 4-pyridone (IV) | 53 minutes | f | 30 minutes | f. |
| 43 | Tri-isopropyl phosphine (V) | 5 seconds | f | 5 seconds | f. |
| 44 | Tri-butyl phosphine (V) | 10 seconds | f | 10 seconds | f. |
| 45 | Trioctyl phosphine (V) | 5 seconds | f | 5 seconds | f. |
| 46 | Triphenyl phosphine (V) | 10 seconds | 40 seconds | 10 seconds | 40 seconds. |
| 47 | Triethyl phosphite (V) | 1 minute | 7 minutes | 1 minute | 7 minutes. |

TABLE 2.—CURING WITH 2.66 MMOLE t-BUTYL PERETHYL FUMARATE, CONTAINED IN 2 ML. TRIETHLY PHOSPHATE SOLUTION

| | | Without base | | With base | |
|---|---|---|---|---|---|
| No. | Activator and class | $t_{gel}$ | $t_{max}$ | $t_{gel}$ | $t_{max}$ |
| 48 | Mercapto succinic acid (I) | 4 hours | f | 9 minutes | 47 minutes. |
| 49 | Thio salicyclic acid (I) | 70 minutes | f | 4 minutes | 19 minutes. |
| 50 | Cysteamine HCl (I) | 60 minutes | f | 12 minutes | 40 minutes. |
| 51 | N,N'-Diethyl thiourea (IId) | 3 hours | f | 75 minutes | f. |
| 52 | Na-O,O-diethyl dithiophosphate (IIe) | 34 minutes | f | 11 minutes | f. |
| 53 | Benzene sulphohydrazide (III) | 4 hours | f | 2.5 hours | f. |
| 54 | 4-pyridone (IV) | do | f | 75 minutes | f. |
| 55 | Triphenyl phosphine (V) | 3 minutes | 24 minutes | 3 minutes | 24 minutes. |
| 56 | (¹) | (¹) | (¹) | (¹) | (¹). |

¹ When 2.66 mmole of triphenyl phosphine and 2.66 mmole of bis. ethyl fumaroyl peroxide were used a gel time of 28 minutes was observed without base and curing took place within 24 hours. The addition of a base had no effect.

The above example shows that a reaction always occurs when combinations according to the invention are used but that no reaction takes place when other compounds such as simple mercaptans or cyclic secondary amines (cf. Experiments 1–4), which are in themselves described as "accelerators," are used in combination with the peroxides according to the invention.

EXAMPLE 2

Polymerization of monomers at room temperature (20° C.)

30 gram samples of monomer were mixed with the following components in 200×30 mm. test tubes.

(a) 1.5 mmole of peroxide according to the invention.
(b) 1.5 mmole of a compound capable of addition according to the invention.
(c) 1.5 mmole of tri-isopropanolamine as base, when used.

The test tubes were then flushed thoroughly with nitrogen, closed and allowed to stand at room temperature. After 24 hours the mixtures were tested for polymer. The results are shown in Tables 3–6. Evaluation was according to the following characteristics:

— = no reaction.
+− = traces of polymer.
+ = polymer in an amount which can be precipitated.
++ = clear increase in the viscosity of the sample.
+++ = solidified (substantially completely polymerized).

The following symbols are used:

$S_1$ = N.N'-diethyl thiourea
$S_2$ = thiosalicylic acid
$N_1$ = benzene sulphohydrazide
$N_2$ = 4-pyridone
$P_1$ = triethyl phosphite
$P_2$ = triphenyl phosphite
TBPM = t-butylpermaleinate
TBPEF = t-butylperethyl fumaroate
EFP = Bis (ethyl fumaroyl) peroxide

TABLE 3.—SUBSTANCE POLYMERIZATION OF METHYL METHACRYLATE

[1 ml. of sample was stirred into 5 ml. methanol to test for polymer which could be precipitated]

| | Without peroxide | | TBPM | | TBPEF | | EFP | |
|---|---|---|---|---|---|---|---|---|
| Activator | Without base | With base | Without base | With base | Without base | With base | Without base | With base |
| None | − | − | − | − | − | − | − | − |
| $S_1$ | − | − | +++ | +++ | − | − | − | − |
| $S_2$ | − | − | +++ | +++ | + | ++ | + | ++ |
| $N_1$ | − | − | − | − | − | ++ | | |
| $N_2$ | − | − | ++ | ++ | ++ | ++ | + | ++ |
| $P_1$ | − | − | ++ | ++ | +++ | +++ | ++ | ++ |
| $P_2$ | − | − | ++ | ++ | +++ | +++ | | |

TABLE 4.—SUBSTANCE POLYMERIZATION OF STYRENE

[1 ml. of sample was stirred into 5 ml. methanol to test for polymer which could be precipitated]

| | Without peroxide | | TBPM | |
|---|---|---|---|---|
| Activator | Without base | With base | Without base | With base |
| None | − | − | − | − |
| $S_1$ | − | − | ++ | ++ |
| $S_2$ | − | − | ++ | ++ |
| $N_1$ | − | − | +− | + |
| $N_2$ | − | − | ++ | ++ |
| $P_1$ | − | − | +− | + |
| $P_2$ | − | − | ++ | ++ |

TABLE 5.—SUBSTANCE POLYMERIZATION OF ACRYLONITRILE

[In this table +++ stands for complete polymerization with boil off usually within 1 hour]

| | Without peroxide | | TBPM | | EFP | |
|---|---|---|---|---|---|---|
| Activator | Without base | With base | Without base | With base | Without base | With base |
| None | − | − | − | − | − | − |
| $S_1$ | − | − | +++ | +++ | − | − |
| $S_2$ | − | − | +++ | +++ | − | − |
| $N_1$ | − | − | +− | + | ++ | ++ |
| $N_2$ | − | − | ++ | ++ | | |
| $P_1$ | − | − | ++ | ++ | + | + |
| $P_2$ | − | − | ++ | ++ | | |

TABLE 6.—SUBSTANCE POLYMERIZATION OF VINYL ACETATE

[The samples were stirred into saturated sodium chloride solution for evaluation]

| | Without peroxide | | TBPM | |
|---|---|---|---|---|
| Activator | Without base | With base | Without base | With base |
| None | − | − | − | − |
| $P_1$ | − | − | ++ | + |

The experimental examples show that only the combinations according to the invention lead to success. The blank tests listed, in which either the peroxide according to the invention or the auxiliaries according to the invention were omitted, showed no reaction.

Experiments in which normal tert butyl perbenzoate was used in place of the peroxides according to the invention also showed no reaction.

EXAMPLE 3

Polymerization of monomers at various temperatures

The experiments were carried out in a manner analogous to Example 2. The extent of conversion was determined after 24 hours by titration of the residual monomer content or by gravimetric determination of the polymer.

Table 7

TABLE 7.—METHYL METHACRYLATE POLYMERIZATION

[The residual monomer content was determined titrimetrically]

| | | Residual monomer content in percent after 24 hrs. at— | | |
|---|---|---|---|---|
| Peroxide | Activator | 20° | 10° | 0° |
| TBPM | $S_2$ | 1.7 | 1.4 | |
| TBPM | $N_2$ | 2.7 | 1.9 | 3.5 |
| TBPM | $P_1$ | 1.6 | 1.9 | |
| TBPEF | $N_2$ | 0.7 | 56.6 | |
| TBPEF | $P_1$ | 4.5 | | |

TABLE 8.—POLYMERIZATION OF A 50% SOLUTION OF ACRYLONITRILE IN DIMETHYL FORMAMIDE AT 20°

[The polymer content was determined gravimetrically after precipitation with methanol]

| Initiator | TBPM+S₂ | TBPM+N₂ | TBPEF+N₂ | TBPEF=P |
|---|---|---|---|---|
| Percent polymer after 24 hours | 18.9 | 26.6 | 34.7 | 28.1 |

EXAMPLE 4

Polymerization of methyl methacrylate

In this series of tests a system according to the invention was compared with the classical initiator lauroyl peroxide for the substance polymerization of 150 gram samples of methyl methacrylate. In all cases, 7.5 mmole of active substance was added. The percentage of polymer formed was determined after various reaction times at the given temperatures.

| Initiator | Temp., °C. | Percent polymer after— | | | | |
|---|---|---|---|---|---|---|
| | | 1 hr. | 2 hrs. | 3 hrs. | 4 hrs. | 5 hrs. |
| TBPM/S₂ | 20 | | 2.4 | 6.0 | 9.5 | 15.6 |
| Lauroyl peroxide | 20 | | 0.12 | 0.19 | 0.26 | 0.31 |
| Do | 40 | 2.0 | 4.2 | 6.5 | 9.8 | 12.8 |

The above experiments show that when lauroyl peroxide is used the temperature chosen must be about 20° C. higher than that used with the system according to the invention to achieve the same degree of conversion.

EXAMPLE 5

Suspension polymerization of vinyl chloride

In these experiments vinyl chloride in aqueous suspension (Ratio VC:H₂O=1:2) was polymerized at 30° C. in the presence of 0.3% of polyvinyl alcohol as an aid to suspension.

Initiator:  Conversion after 7 hours, percent
0.5% lauroyl peroxide _____ 11.5
0.25% lauroyl peroxide+0.1% TBPM/P₂ ___ 17.0

Although only half the amount of lauroyl peroxide was used in the second case the degree of polymerization is clearly higher. This comparison test thus shows the high efficiency of the systems according to the invention even when they are combined with conventional initiators.

What is claimed is:

1. A process which comprises polymerizing olefinic compounds in the presence of a polymerization initiator comprising in combination (A) a peroxy compound selected from the group consisting of an organic perester containing the structure

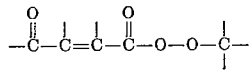

and a diacyl peroxide containing the structure

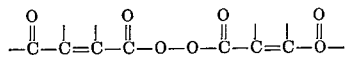

and (D) at least an equal molar quantity of an activator compound selected from the group of classes consisting of:

(I) polyfunctional sulfhydryl compounds;
(II) compounds with sulfhydryl radicals bonded to heteropolybonds selected from the group consisting of (a) salts of thiocyanic acid,
(b) thiocarboxylic acids and thiocarbonamides,
(c) dithiocarbamates and mercaptothiazoles,
(d) thiourea, substituted thioureas, thiobarbituric acids, thiosemicarbazides and mercaptoimidazoles, and
(e) O,O-diesters of dithiophosphoric acid and dithiophosphinic acid;

(III) alkyl and aryl sulphonyl hydrazides;
(IV) 4-hydroxy pyridines and their tautomeric 4-pyridones; and
(V) compounds having the formula (R)₃P and (RO)₃P, wherein R is selected from the group consisting of an alkyl group having from 1 to 6 carbon atoms and an aryl group, said polymerization being conducted at a temperature below the polymerization temperature applicable when only the peroxy compound is used without one of said activators.

2. A process according to claim 1 wherein the peroxy compound is a perester which is the reaction product of a member selected from an ethylene dicarboxylic acid and a semiester thereof and a member selected from a t-alkyl hydroperoxide and 2,5-dimethyl - 2,5 - dihydroperoxy hexane.

3. A process according to claim 2 wherein said perester is t-butyl permaleinate.

4. A process according to claim 1 wherein said activator is a class IId compound selected from the group consisting of thiourea, mono- and di-alkyl thioureas wherein the alkyl group contains not more than 4 carbon atoms, mono- and diphenyl thioureas, a thiosemicarbazide, a thiobarbituric acid and a mercaptoimidazole.

5. A process according to claim 1 wherein said peroxy compound is used in an amount of from 0.1 percent by weight of the olefinic compound.

6. A process according to claim 1 wherein an amine selected from the group consisting of aliphatic amine and a hetero-cyclic amine is included in said initiator.

7. A process according to claim 1 wherein the olefinic compound is selected from the group consisting of methyl methacrylate, styrene, acrylonitrile, vinyl acetate and vinyl chloride.

8. A process according to claim 1 wherein the polymerization is conducted at a temperature not exceeding 40° C.

9. A process according to claim 1 wherein the polymerization is conducted at a temperature of from 10° to 30° C.

10. A process according to claim 1 wherein said initiator is introduced into said olefinic compound in the form of a solution, said solution consisting of said initiator and an organic solvent.

References Cited

UNITED STATES PATENTS

| 2,757,166 | 7/1956 | Segro | 260—85.5 |
| 2,520,601 | 8/1950 | Lee | 260—45.4 |
| 2,659,716 | 11/1953 | Park | 260—92.8 |

HARRY WONG, JR., Primary Examiner

U.S. Cl. X.R.

252—426; 260—75, 78.4, 78.5, 80, 80.3, 85.5, 85.7, 87.5, 87.7, 88.1 89.1, 89.5, 91.1, 91.7, 92.8, 93.5, 94.9